Figure 1:
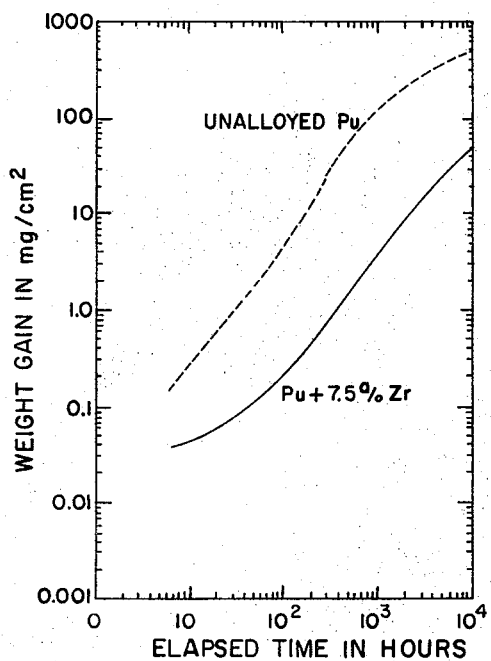

Aug. 30, 1960

F. W. SCHONFELD ET AL 2,950,967

PLUTONIUM-ZIRCONIUM ALLOYS

Filed Aug. 29, 1957

WITNESSES:

INVENTORS
FRED W. SCHONFELD
JAMES T. WABER

BY

United States Patent Office 2,950,967
Patented Aug. 30, 1960

2,950,967

PLUTONIUM-ZIRCONIUM ALLOYS

Fred W. Schonfeld and James T. Waber, Los Alamos, N. Mex., assignors to the United States of America as represented by the United States Atomic Energy Commission Filed Aug. 29, 1957, Ser. No. 681,128

1 Claim. (Cl. 75—122.7)

The present invention relates to alloys of plutonium and more specifically to alloys of plutonium which are useful in neutronic reactors as the fuel of such reactors.

Neutronic reactors have been constructed and operated in which the fuel element has been essentially pure plutonium. One example of such reactor is the Los Alamos fast reactor known as "Clementine," fully described in the Atomic Energy Commission report LA–1679. Such reactors use a fairly small volume of fuel because of the excellent nuclear properties of pure plutonium. Consequently, the heat developed in the fuel region is confined to a very small volume, and presents the attendant difficulties of removing a large quantity of heat from a small volume.

In a reactor using uranium for the fuel elements where the fuel is actually atoms of the isotope $U^{235}$, an expansion of the fuel volume is automatically achieved by controlling the degree of enrichment of $U^{235}$ within a matrix of $U^{238}$. The percent enrichment of $U^{235}$ can be selected from zero to 100% by the degree of isotope separation of $U^{235}$ from normal uranium.

Plutonium, however, is produced as the almost pure isotope $Pu^{239}$ and contains only small percentages of higher isotopes. All of these are fissile, and thus the same type of isotopic dilution achieved in uranium is not possible with plutonium. In order to gain the advantages of dispersed fuel, it is necessary to add to the plutonium atoms some foreign element. The choice of the diluting element is not a matter which can be settled by the selection of almost any available metal because of the strict requirements which must be made for reactor use. These requirements for a suitable neutronic alloy are:

(1) A neutronic compatibility with the system. The element must not be a strong absorber of neutrons in the energy range of the neutrons of the reactor system.

(2) An improvement of the fabrication characteristics of plutonium. The added element must produce an alloy which can be fabricated to fuel elements with considerable ease.

(3) A ready alloying with the plutonium. The added element must alloy with plutonium with ease so that the preparation of the alloy is a simple metallurgical step.

(4) An improvement in corrosion resistance. In most neutronic reactors, corrosion of the fuel elements is a very definite problem. Since plutonium does not have especially good corrosion resistance, it is highly desirable that an alloying element improve the resistance to any kind of corrosion to which the fuel element might be subjected.

(5) A reasonable radiation stability. As is well known, many fuel element alloys subjected to a large flux of neutrons will change their physical and mechanical characteristics. Some materials exhibit a greater resistance to changes under these conditions than others.

It has been found that the element zirconium when alloyed with plutonium in a wide range of percentages will produce an alloy which meets the above stringent requirements.

It is therefore an object of this invention to provide alloys of plutonium and zirconium having good neutronic, corrosion and fabrication characteristics.

Another object of this invention is to provide alloys of plutonium and zirconium having good dimensional characteristics through wide temperature ranges.

Figure 2:
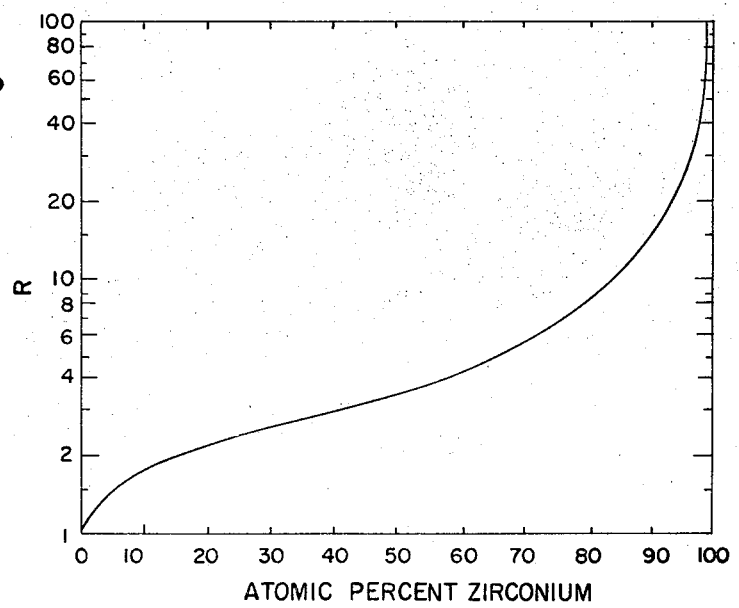

Further objects of this invention will be apparent from the following description and claims, and Figures 1 and 2 of the drawings, hereby made a part of the specification. Figure 1 is a curve showing the improved corrosion resistance of one of the plutonium-zirconium alloys and Figure 2 is a computed curve showing the increase in the amount of plutonium needed for a critical mass of alloy.

The preferred embodiment of the present invention comprises an alloy system of plutonium and zirconium consisting essentially of from about 5 to about 50% zirconium, the balance plutonium, the alloys having a face-centered cubic structure of the Al type as exemplified by delta phase plutonium. The percentages referred to here and everywhere in this specification are atomic percentages, except where some other unit is specifically indicated.

Preparation

The alloys of the present invention, in the preferred embodiment, are prepared and cast in a vacuum or in an inert atmosphere such as helium or argon. Alloys containing up to about 10% zirconium can be melted quite successfully in crucibles of magnesium oxide prepared, for example, by the method described in copending application S.N. 597,829, Allison, filed July 13, 1956, now Patent No. 2,902,380. With higher zirconium contents, reaction of the alloy with the mold or crucible becomes serious, particularly as the temperatures necessary to achieve melting and alloying are higher. Alloys containing from about 10 to about 70% zirconium can be produced in thoria crucibles; however, alloys containing more than about 50 atomic percent can be better produced by conventional arc melting techniques. Arc melting has the advantage of rapidly cooling the alloys after they are formed which tends to inhibit segregation.

Properties of the alloys

It is known that unalloyed plutonium is composed of a face-centered cubic, delta phase between the temperatures of from approximately 320° to 450° C., of a delta prime phase between approximately 450° and 475° C., and of an epsilon phase from approximately 475° C. to the melting point of about 640° C. Unalloyed plutonium has many physical properties which makes its use undesirable in a neutronic reactor. For example, the delta phase of unalloyed plutonium occurs in a narrow temperature range and readily transforms on heating or cooling to other crystal modifications with simultaneous increases in density. In addition, this delta or face-centered-cubic phase has a negative coefficient of thermal expansion (approximately $-9 \times 10^{-6}$ in./in. ° C.) Such changes in density have serious effects on the reactivity of a neutronic reactor as the criticality of a reactor will increase as the temperature rises, resulting in a dangerous condition.

The result of X-ray diffraction, metallographic and thermal analysis studies show that upon addition of zirconium to plutonium the delta phase of the plutonium is retained at increasingly higher temperatures as the zirconium content is increased up to about 50%. With similar zirconium additions the delta phase is metastably retained at room temperature. At equilibrium, alloys within the range of from about 5 to about 50 a/o will be composed of a mixture of the delta phase plus an intermetallic compound of complex structure (zeta phase). However, formation and precipitation of the zeta phase from the delta phase is very sluggish and no significant amount of the zeta phase will be present at room temperatures for an appreciable length of time in the absence of suitable low temperature heat treatment. Of course, the delta phase can be regained by utilization of other heat treatment techniques well known to the art. Past experience has shown that this delta phase when found in plutonium alloy systems has excellent fabrication properties and improved corrosion resistance. Alloying with zirconium minimizes or eliminates the undesirable phase and dimensional changes characteristic of pure plutonium.

When plutonium is alloyed with increasing amounts of zirconium, the coefficient of thermal expansion becomes less negative, and then turns positive. For example, in an alloy containing 50 atomic percent zirconium the coefficient of thermal expansion is $8 \times 10^{-6}$ in./in. °C. (positive) and is isotropic. Thus when such an alloy is used in a neutronic reactor a rise in temperature causes a decrease in density with a decrease in criticality, resulting in a self-limiting criticality.

When a low zirconium alloy is formed (above 5 atomic percent zirconium) the physical properties are not changed as markedly as, for example, an alloy of 50 atomic percent plutonium. However, a 5 atomic percent zirconium alloy does have decided advantages as compared to unalloyed plutonium. A 5 atomic percent alloy can be heated to higher temperatures before the undesirable epsilon phase begins to form, and the delta prime phase which occurs in unalloyed plutonium at 450° C. is eliminated.

A great problem in reactor design is the selection of materials which can withstand high neutron fluxes without premature deleterious effects. The highly localized release of fission energy in the alloy is responsible for these effects as well as recoil energy from neutron and gamma rays striking the alloy atoms. Part of the fission and recoil energy causes defects in the alloy such as vacancies and interstitial atoms. The radiation damage from these causes takes several forms, but one that has been very serious is the change of the physical size of the fuel element. When a fuel element does not have an isotropic crystal structure these growth changes are more pronounced so that isotropic crystal structures are to be preferred. The delta phase is isotropic and is relatively soft. A material which is initially soft can withstand a large amount of neutron bombardment without rapidly becoming unusably brittle, as the material has a long range of hardness change to undergo before it becomes too brittle. The alloys of the present invention have this desirable characteristic, as they are not hard and brittle initially.

Because zirconium has such excellent neutronic properties, a finite critical mass can be achieved with alloys containing only small percentages of plutonium.

The corrosion properties of the alloy of the present invention are superior to pure plutonium with the corrosion resistance increasing with an increase of zirconium content. Moisture does not attack the alloy readily, as it does plutonium, and the alloy is resistant to many corroding atmospheres which normally attack pure plutonium quickly. Figure 1 is an illustration of this corrosion resistance when the corroding medium is moist air. After 10,000 hours the relative corrosion of the plutonium-zirconium alloy was one-tenth of that of unalloyed plutonium. It should be noted that the amount of zirconium used in the test as illustrated in Figure 1 was only 7.5 atomic percent.

The nuclear properties of zirconium are excellent for reactor use, and alloys containing up to 98% zirconium may be used as a reactor fuel. Other elements which absorb many neutrons in any manner would not be suitable for reactor fuels in this large a proportion. When plutonium is alloyed with another element there is an increase in the amount of plutonium needed for a critical mass of alloy. This increase depends on the volume occupied by the alloy and the neutronic characteristics of the alloying element. Since plutonium is a very expensive metal it is desirable to keep the increase in plutonium as low as possible. If we designate a ratio, R, as $$R = \frac{\text{Weight of plutonium in a critical mass of alloy}}{\text{Weight of critical mass of unalloyed plutonium}}$$

it can be seen that a perfect but unobtainable ratio would be unity for all alloys. Thus it is important to keep R as close to unity as possible. Zirconium is an excellent element for keeping R low. Figure 2 shows values of R. Most elements have an R considerably above zirconium for any given percent. (For example, R for 50-50 Pu-Sn alloy is 3.8; for 50-50 Pu-Pb is 3.5; and for 50-50 Pu-Bi is 4.2.)

*General considerations*

When the alloy of the present invention is used in a reactor, the volume of material in which the heat of the reactor is borne is considerably greater than for pure plutonium, making it is easier to remove this heat. Furthermore, the corrosion resistance, thermal conductivity, and fabricability of the alloy are better than those of pure plutonium. If the plutonium-zirconium alloy is used in a reactor such as "Clementine," the number of fuel rods will be increased in an amount which can be determined by methods well-known in the art. In that particular design, the added fuel rods can be placed in a volume gained by using fewer uranium rods within the fuel cage. In other reactors using plutonium as the fuel element, it is obvious that the fuel cavity can be designed to accommodate the fuel volume required for the plutonium-zirconium alloy without any radical change in design.

It is also recognized that when small percentages of certain other elements are added to zirconium, the corrosion resistance of zirconium alone as well as plutonium-zirconium alloy are increased markedly. Zirconium which has been thus alloyed is known as Zircaloy in the art. A typical composition of Zircaloy is as follows:

1.5 weight percent tin
0.20 weight percent iron
0.05 weight percent chromium
0.03 weight percent nickel
Balance—zirconium

What is claimed is:

A neutronic reactor fuel alloy consisting essentially of from about 5 to about 50 atomic percent zirconium and the balance plutonium, said alloy having a face-centered cubic structure of the A1 crystal type.

References Cited in the file of this patent

Taylor: "An Introduction to X-Ray Metallography," pages 110, 111. John Wiley & Sons, N.Y. (1952).
Coffinberry et al.: "Peaceful Uses of Atomic Energy," vol. 9, page 140 (1955).
Finniston et al.: "Metallurgy and Fuels," Pergamon Press, New York (September 1956), pages 396 and 403.